(12) United States Patent
Slupik

(10) Patent No.: US 10,218,794 B2
(45) Date of Patent: Feb. 26, 2019

(54) SYSTEM AND METHOD FOR DECISION-MAKING BASED ON SOURCE ADDRESSES

(71) Applicant: Silvair Sp. z o.o., Kraków (PL)

(72) Inventor: Szymon Slupik, Kraków (PL)

(73) Assignee: Silvair Sp. z o.o., Kraków (PL)

( * ) Notice: Subject to any disclaimer, the term of this patent is extended or adjusted under 35 U.S.C. 154(b) by 16 days.

(21) Appl. No.: 15/553,019

(22) PCT Filed: Feb. 22, 2016

(86) PCT No.: PCT/US2016/018862
§ 371 (c)(1),
(2) Date: Aug. 23, 2017

(87) PCT Pub. No.: WO2016/137857
PCT Pub. Date: Sep. 1, 2016

(65) Prior Publication Data
US 2018/0054488 A1 Feb. 22, 2018

Related U.S. Application Data

(60) Provisional application No. 62/120,787, filed on Feb. 25, 2015.

(51) Int. Cl.
*H04L 29/08* (2006.01)
*H04W 4/70* (2018.01)
(Continued)

(52) U.S. Cl.
CPC .............. *H04L 67/12* (2013.01); *G05B 15/02* (2013.01); *H04L 12/02* (2013.01); *H04W 4/70* (2018.02); *H04W 84/18* (2013.01)

(58) Field of Classification Search
CPC ........ H04L 67/12; H04L 12/02; H04W 84/18; H04W 4/70; G05B 15/02
See application file for complete search history.

(56) References Cited

U.S. PATENT DOCUMENTS

2010/0073148 A1 3/2010 Banks
2010/0074234 A1* 3/2010 Banks .................. H04L 1/1867
370/338

(Continued)

OTHER PUBLICATIONS

International Search Report, International Application No. PCT/US2016/018862.

(Continued)

*Primary Examiner* — Walli Z Butt
(74) *Attorney, Agent, or Firm* — McGeary Cukor LLC; Kenneth Ottesen; Jason Paul DeMont

(57) ABSTRACT

An automation system that does not require any of the source node devices transmitting packets of information to have knowledge of the recipients of those packets. The automation system comprises sensor nodes and actor nodes. The sensor nodes transmit information via a wireless network based on conditions that are sensed by the sensors, such as a button being pushed, motion being detected, or the current ambient light level. The actor nodes detect the information that is transmitted over the wireless network and control their device functions, such as lighting and climate control, based on the information detected. In particular, the actor nodes monitor the network for packets that contain information that is relevant to each node, such as one or more sensor node source addresses previously configured to be of interest to each actor node and which are used in the decision-making that is performed by each actor node.

17 Claims, 12 Drawing Sheets

(51) Int. Cl.
*G05B 15/02* (2006.01)
*H04L 12/02* (2006.01)
*H04W 84/18* (2009.01)

(56) References Cited

U.S. PATENT DOCUMENTS

2013/0291100 A1* 10/2013 Ganapathy .............. H04W 4/70
                                                                 726/22
2014/0293276 A1* 10/2014 Hughes ................. G01J 1/4204
                                                                 356/222
2016/0344670 A1* 11/2016 Wu ........................ H04L 51/14
2017/0293273 A1* 10/2017 Slupik .................... G05B 15/02

OTHER PUBLICATIONS

Written Opinion of the International Search Authority, International Application No. PCT/US2016/018862.

* cited by examiner

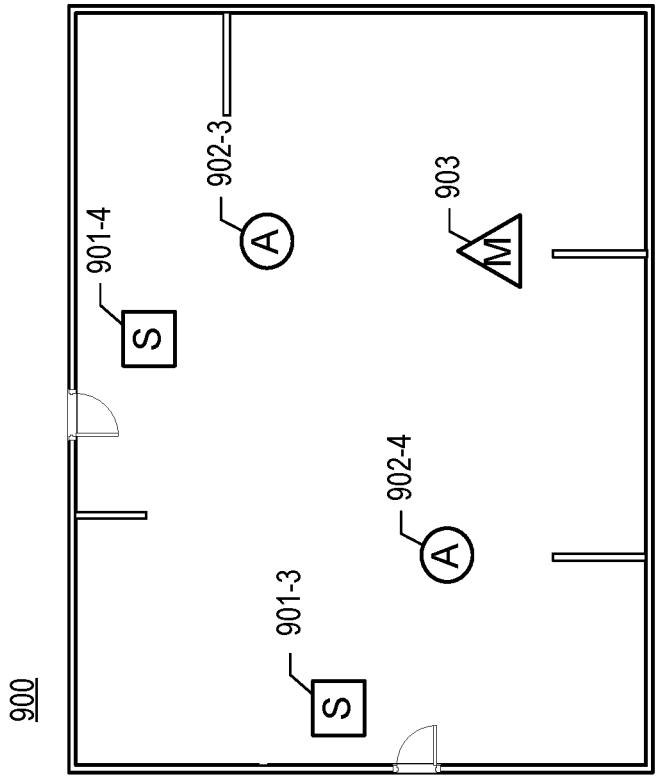
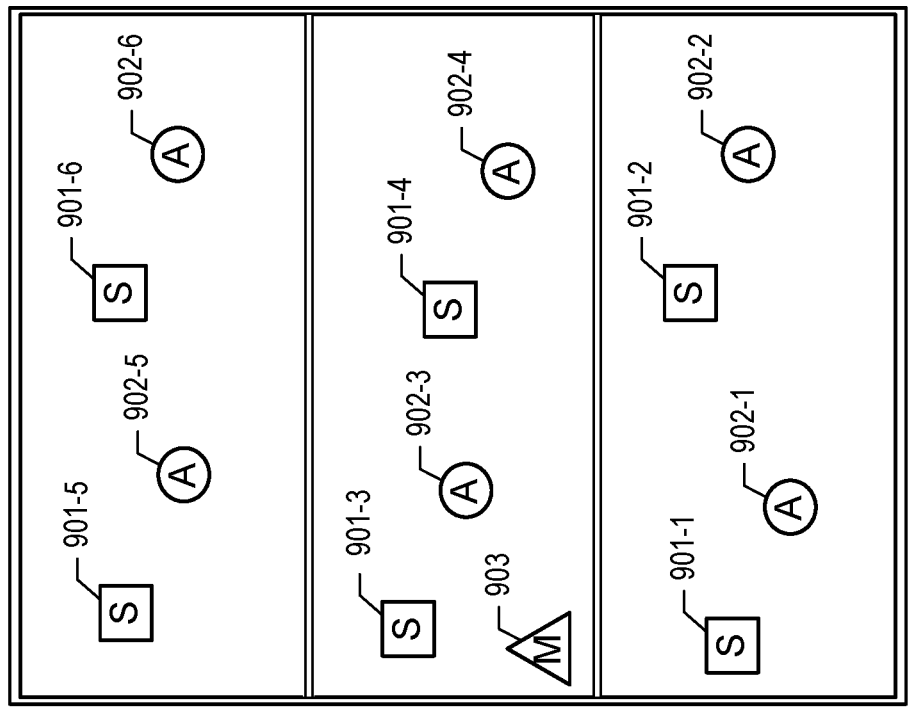

1100 ns by one or more of the actor nodes, based on i) the input signals received from one or more of the sensor nodes and ii) one or more memorized states.

SYSTEM AND METHOD FOR DECISION-MAKING BASED ON SOURCE ADDRESSES

CROSS REFERENCE TO RELATED APPLICATIONS

The following document is incorporated by reference herein: U.S. Provisional Application Ser. No. 62/120,787, filed Feb. 25, 2015. If there are any contradictions or inconsistencies in language between this application and any document that has been incorporated by reference that might affect the interpretation of the claims in this application, the claims in this application should be interpreted to be consistent with the language in this application.

FIELD OF THE INVENTION

The present invention relates to building automation and control in general, and, more particularly, to an automation system with decision-making based on source addresses.

BACKGROUND OF THE INVENTION

"Commercial building automation," or "commercial automation," refers to the use of computer and information technology to control commercial building systems, such as lighting, HVAC, audio-visual, smoke detection, security, and shading, among others. Using specialized hardware, building devices can be monitored and controlled automatically. Although commercial automation has been available at some level of sophistication for some time, it steadily becomes more practical, both from a technological and cost perspective. This is due in part to the rapid advancement of information technology.

A sophisticated commercial automation system might include sensors (e.g., of temperature, of light, of motion, etc.), controllers (e.g., a general-purpose personal computer, a dedicated automation controller, etc.), and actuators (e.g., motorized valves, switches, etc.). The system might also include a human-machine interface device that enables an occupant of the building to interact with the system. The interface can be a specialized terminal or an application ("app") running on a smartphone or tablet computer. The various system devices communicate over dedicated wiring, or over a wired network, or wirelessly, using one or more protocols.

FIG. 1 depicts building automation system 100 in the prior art. System 100 comprises: sensor nodes 101-1 through 101-G, wherein G is a positive integer; actor nodes 102-1 through 102-H, wherein H is a positive integer; and controller 110. The aforementioned elements are logically interconnected as shown, and are interconnected either wirelessly or via wired connections.

Sensor nodes 101-1 through 101-G include one or more of: motion sensors, temperature sensors, light sensors, and air quality sensors. Actor nodes 102-1 through 102-H are building devices that include one or more of: lamps, possibly with adjustable brightness and/or color; window blinds that can be opened and closed; and HVAC (heating, ventilation, and air conditioning) systems. Using such sensor and actor nodes, building automation system 100 is capable of triggering and acting on certain conditions as a function of sensor readings, such as turning on lights when motion is detected or when ambient light is low, controlling HVAC systems in response to temperature variations, and so forth. Controller 110 coordinates and executes the actions to be taken by one or more of the actor nodes, based on i) the input signals received from one or more of the sensor nodes and ii) one or more memorized states.

SUMMARY OF THE INVENTION

The present invention enables an automation system that does not require any of the source node devices transmitting packets to have knowledge of the recipients of those packets, wherein the packets convey information sensed by the source nodes. The disclosed automation system comprises sensor nodes and actor nodes. The sensor nodes transmit information via a wireless network based on conditions that are sensed by the sensors, such as a button being pushed, motion being detected, or the current ambient light level. The actor nodes detect the information that is transmitted over the wireless network and control their device functions based on the information detected. The sensor and actor nodes are capable of interoperating without the need for a centralized controller to distribute the packets.

Part of what enables such a system is a software application ("app") that is used for the initial configuring of the automation system. The software application can be executed on a mobile station, such as a smartphone. The configuring process results in the actor nodes being initialized with a set of data elements having certain, configured values. The data elements include one or more source addresses that correspond to sensor nodes that are relevant to a particular actor node, and a triggering event or events to look out for, such as "motion is being sensed" or "ambient light level is at 40%." In some embodiments of the present invention, the data elements can also include a control value (e.g., a brightness level, a temperature, etc.) to be applied whenever an actor node detects a data packet or combination of packets that are reporting the configured set of conditions from the configured source addresses.

After the sensor and actor nodes are configured, the sensor nodes transmit packets into the network based on conditions that are sensed in their environments. The packets contain data values that are relevant to the preconfigured information. The network itself is based on the Bluetooth Low Energy (BLE) protocol, in some embodiments of the present invention. Meanwhile, the actor nodes monitor the network for packets that contain source addresses of interest, as determined by the configuring process. As a result of decision-making that is based in part on the source address detected in each packet, the actor node can act on the packet by controlling the node's device function, such as a lighting/dimming function, a heating function, or a window-blind motor control function, for example and without limitation.

In some embodiments of the present invention, the actor nodes also monitor the network for packets that contain information of scenes that are relevant to each node, as determined by the configuring process. Based on this information, as well as on the source addresses contained in the packets, the node acts on the information by controlling its device function, such as a single-channel lighting/dimming function, a multi-channel color (RGB) lighting/dimming function, a heating function, or a window-blind motor control function, for example and without limitation.

None of the sensor nodes (or actor nodes, for that matter) needs to know who the recipients are of the data packets that are being transmitted (e.g., broadcast, etc.). Accordingly, the packets themselves do not necessarily contain the address or addresses of the recipient or recipients, at least in some embodiments. In short, instead of being driven by addressing each individual actor node, the automation system disclosed herein is driven by i) source addresses identified in the packets and ii) sensor events detected by sensor nodes corresponding to the source addresses. Advantageously, such an automation system in which the actor nodes make decisions based on source addresses and in which knowledge of any recipient nodes is not required, makes the system easier to configure and manage, and at the same time supports the control of device functions at the actor nodes, wherein the control is based on conditional logic.

An illustrative system comprises a first actor node, the first actor node comprising: a memory configured to store a first source address, as configuration information for acting on the first source address when detected in a data packet; a receiver configured to monitor a plurality of wirelessly-transmitted data packets for the first source address, wherein the transmitted packets originate at one or more sensor nodes; and a processor configured to: a) act on a packet having the first source address, at least in part by generating a first signal in response to the first actor node detecting, in the plurality of transmitted packets being monitored, the packet having the first source address, and b) discard a packet that is absent any source address of the one or more sensor nodes, in response to the first actor node detecting, in the plurality of transmitted packets being monitored, the packet that is absent the source address.

An illustrative method comprises: storing into a memory, by a first actor node, a first source address, thereby configuring the first actor node, at least in part, to act on the first source address when detected in a data packet; monitoring, by the first actor node, a plurality of wirelessly-transmitted data packets for the first source address, wherein the transmitted packets originate at one or more sensor nodes; if, in the plurality of transmitted packets being monitored, the first actor node detects any packet having the first source address, acting on the packet having the first source address, at least in part by generating a first signal; and if, in the plurality of transmitted packets being monitored, the first actor node detects any packet that is absent any source address of the one or more sensor nodes, discarding the packet that is absent any source address.

Another illustrative system comprises a first actor node, the first actor node comprising: a memory configured to store i) a first source address of a first sensor node and ii) a second source address of a second sensor node, as configuration information for acting on the first and second source addresses when detected in data packets; a receiver configured to monitoring a plurality of wirelessly-transmitted data packets for the first and second source addresses, wherein the transmitted packets originate at a plurality of sensor nodes that comprises the first and second sensor nodes; and a processor configured to generate a signal in response a detection of both i) a first packet having the first source address and ii) a second packet having the second source address, the signal being based on i) a first event whose occurrence is indicated by the first sensor node and ii) a second event whose occurrence is indicated by the second sensor node.

Another illustrative method comprises: storing into a memory, by a first actor node, i) a first source address of a first sensor node and ii) a second source address of a second sensor node, thereby configuring the first actor node, at least in part, to act on the first and second source addresses when detected in data packets; monitoring, by the first actor node, a plurality of wirelessly-transmitted data packets for the first and second source addresses, wherein the transmitted packets originate at a plurality of sensor nodes that comprises the first and second sensor nodes; and if, in the plurality of transmitted packets being monitored, the first actor node detects both i) a first packet having the first source address and ii) a second packet having the second source address, generating a signal based on i) a first event whose occurrence is indicated by the first sensor node and ii) a second event whose occurrence is indicated by the second sensor node.

BRIEF DESCRIPTION OF THE DRAWINGS

FIGS. 9A and 9B depict illustrative floor plans of building 900.

DETAILED DESCRIPTION

Figure 1:
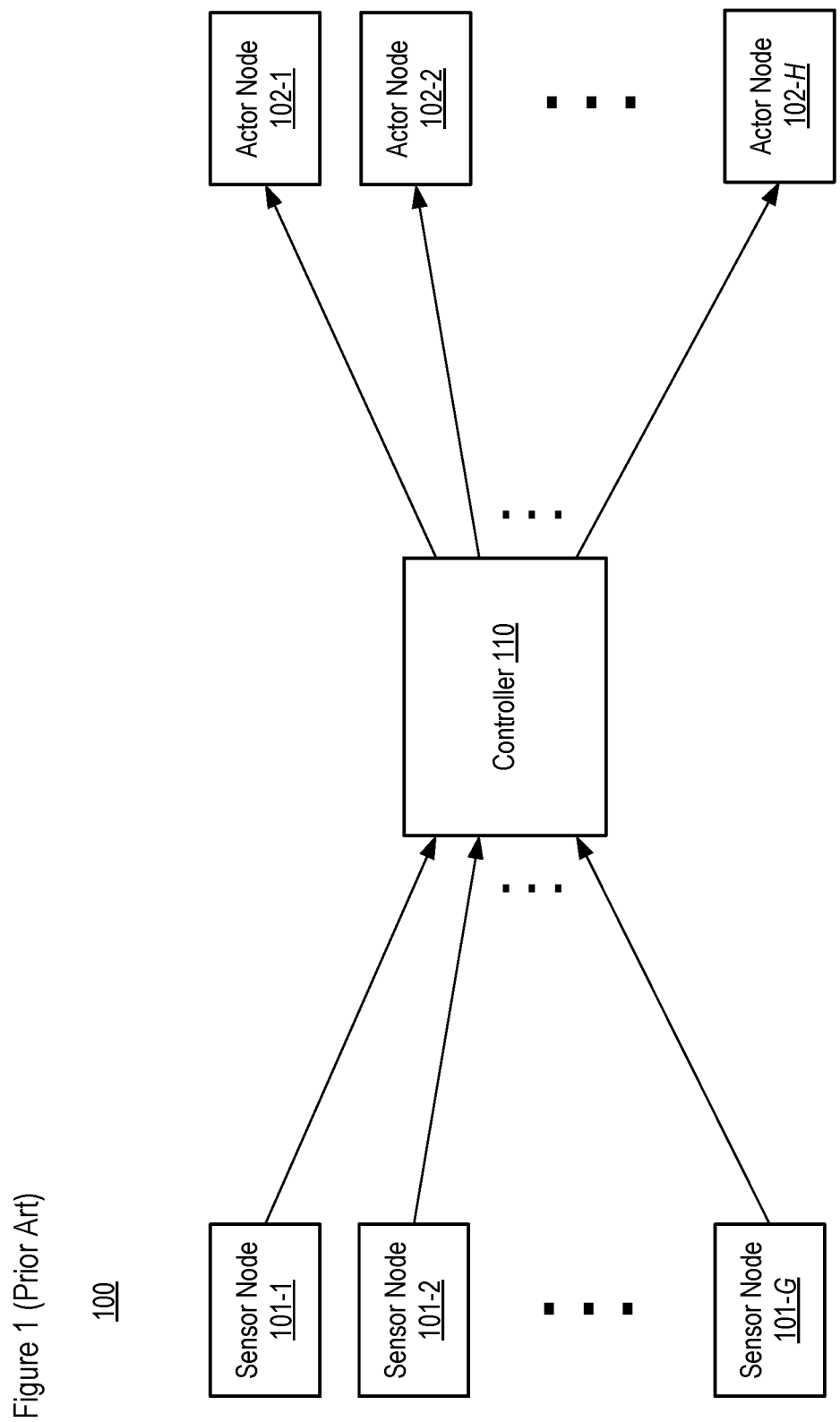
FIG. 1 depicts building automation system 100 in the prior art.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Data element—For the purposes of this specification, the term "data element" is defined as a named unit of data.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Lamp—For the purposes of this specification, the term "lamp" is defined as a device for providing illumination, comprising an electric bulb and its holder. A "smart lamp" is a lamp that is capable of being controlled, or of controlling itself, in order to make adjustments based on conditions such as, while not being limited to, occupancy or daylight availability.

Light—For the purposes of this specification, the term "light" is defined as a source of illumination.

Network address—For the purposes of this specification, the term "network address," or "computer network address," is defined as a numerical label assigned to each device (e.g., sensor node, actor node, configuring node, etc.) participating in a computer network. For example, an Internet Protocol address (IP address) is a numerical label assigned to each device participating in a computer network that uses the Internet Protocol for communication. A "source address" is an example of a network address, in that it specifies the device that originated a transmitted packet or message conveyed by one or more packets.

Packet—For the purposes of this specification, the term "packet," or "data packet," is defined as a unit of data made into a single package that travels along a given network path. The header of each packet (e.g., IP packet) contains, among other things, the numerical source address of the packet. In some embodiments of the present invention, the header can also contain a destination address.

Processor—For the purposes of this specification, the term "processor" is defined as hardware or hardware and software that perform mathematical and/or logical operations.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Figure 2:
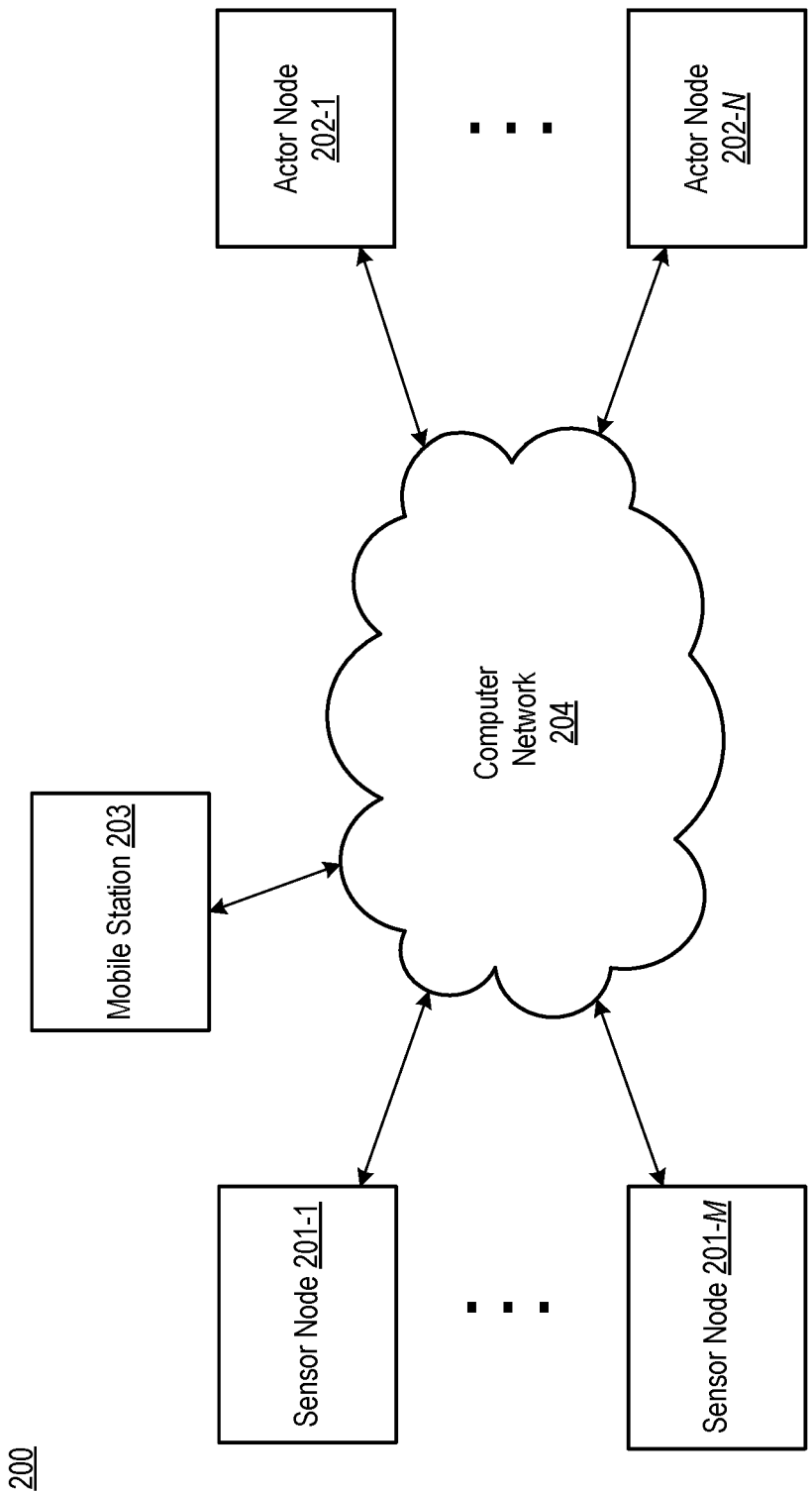
FIG. 2 depicts automation system 200, in accordance with an illustrative embodiment of the present invention.

FIG. 2 depicts automation system 200, in accordance with an illustrative embodiment of the present invention. System 200 comprises: sensor nodes 201-1 through 203-M, wherein M is a positive integer; actor nodes 202-1 through 202-N, wherein N is a positive integer; mobile station 203; and computer network 204. The aforementioned elements are interconnected as shown and, as depicted, are physically distinct devices with respect to one another. The elements that make up system 200 communicate wirelessly; in some alternative embodiments of the present invention, however, one or more of the depicted elements can communicate via wired connections.

In accordance with an illustrative embodiment of the present invention, automation system 200 is an automation and control system in a commercial building, such as an office space or a retail space. As those who are skilled in the art will appreciate after reading this specification, however, automation system 200 can also be applied to a different type of building, such as a home, or to include the environment surrounding the building, or to any environment in which automated control can be applied.

Sensor node 201-m, wherein m has a value between 1 and M, inclusive, is an apparatus that comprises memory, processing components, and communication components. Sensor node 201-m is configured to transmit signals providing sensor-related information. Sensor node 201-m is described in detail below and in FIG. 3. In some embodiments of the present invention, one or more of the sensor nodes can be virtual sensors, which refers web or network services that provide information such as time-of-day, date, day/night indication, sun elevation/azimuth, and so on, for example and without limitation.

Actor node 202-n, wherein n has a value between 1 and N, inclusive, is an apparatus that comprises memory, processing components, and communication components. Actor node 202-n is configured to receive signals conveying data packets that the node uses to control corresponding device functions and/or affect a condition, physical or otherwise, in the node's environment, in part by generating a signal (e.g., a control signal, etc.). In doing so, actor node 202-n is said to act on (or upon) the received data. Actor node 202-n is described in detail below and in FIG. 4.

In some embodiments, at least one of the sensor nodes and/or actor nodes is configured to both i) transmit signals that provide sensor-related information and ii) receive signals that the node uses to control corresponding device functions and/or affect a condition, physical or otherwise, in the node's environment. Also, in some embodiments, at least some of the sensor nodes and/or actor nodes can distribute data according to a mesh network. A "mesh network" is a network topology in which each node replays data for the network. The nodes that are involved cooperate in the distribution of data in the network. A mesh network can relay messages using either a flooding technique or a routing technique.

Mobile station 203 is a wireless telecommunications terminal that is configured to transmit and/or receive communications wirelessly. It is an apparatus that comprises memory, processing components, and communication components. Mobile station 203 comprises the hardware and software necessary to be compliant with the protocol standards used in the wireless network in which it operates and to perform the processes described below and in the accompanying figures. Mobile station 203 is described in detail below and in FIG. 5.

Furthermore, mobile station 203 is illustratively a smartphone with at least packet data capability provided and supported by the network in which it operates and that is configured to execute a software application (e.g., an "app") for controlling and/or configuring one or more of the other devices depicted in FIG. 2. In some alternative embodiments of the present invention, mobile station 203 can be referred to by a variety of alternative names such as a wireless transmit/receive unit (WTRU), a user equipment (UE), a wireless terminal, cell phone, or a fixed or mobile subscriber unit, or can be any other type of device (e.g., personal computer, laptop, notebook, tablet, phablet, etc.) that is capable of operating in a wireless network environment, either mobility-oriented or otherwise.

Computer network 204 is a wireless personal area network (WPAN) that provides the elements of system 200 with connectivity to one other. In accordance with an illustrative embodiment of the present invention, network 204 comprises a communications medium for transmitting packets of data in accordance with the Bluetooth Low Energy (BLE) protocol.

In some other embodiments of the present invention, computer network 204 is a different type of WPAN than one that is BLE-based. For example and without limitation, network 204 can be based on Z-Wave, ZigBee, Thread, Wi-Fi, or classic Bluetooth. As those with ordinary skill in the art will appreciate after reading this disclosure, in some embodiments of the present invention, network 204 can comprise one or more of the aforementioned networks and/or other computer or telecommunication networks, without limitation. Furthermore, as those with ordinary skill in the art will appreciate after reading this disclosure, computer network 204 can comprise elements that are capable of wired and/or wireless communication, without limitation.

Figure 3:
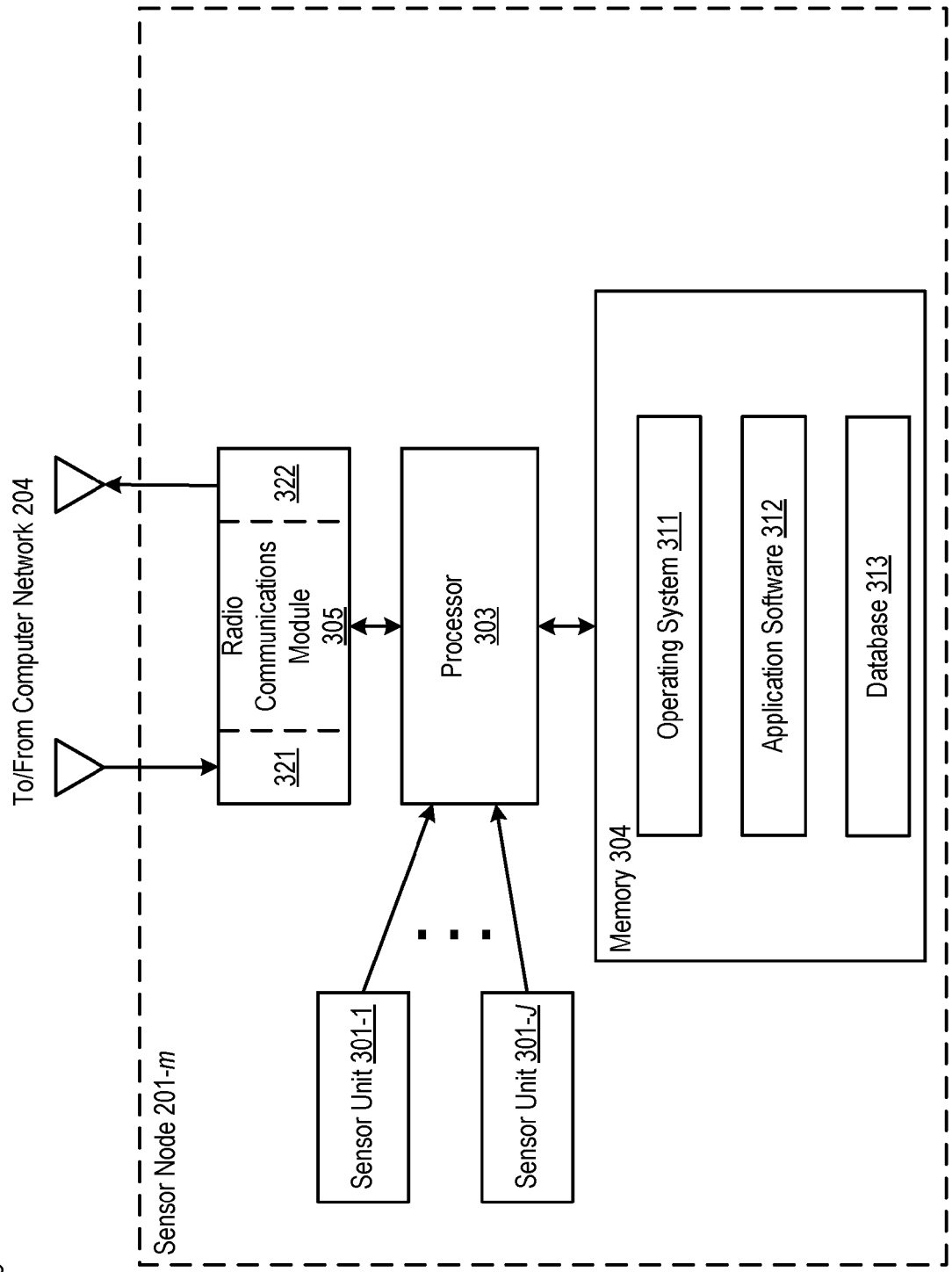
FIG. 3 depicts the salient components of sensor node 201-*m* of system 200.

FIG. 3 depicts the salient components of sensor node 201-*m* according to an illustrative embodiment of the present invention. Sensor node 201-*m* is based on a data-processing apparatus whose hardware platform comprises: sensor unit 301-1 through 301-J, wherein J is a positive integer; processor 303, memory 304, and radio communications module 305, interconnected as shown. In some alternative embodiments, there can also be one or more actor units present and as part of the sensor node, which are described below and in FIG. 4.

Sensor unit 301-*j*, wherein j has a value between 1 and J, inclusive, is an apparatus that comprises memory, processing components, and communication components, and is configured to gathers information about the environment that is accessible by the sensor unit. Each sensor unit generates an indication of an event (generates an "event") based on a state change as a result of an external event occurring (e.g., pushbutton pressed, motion detected, etc.) or an internal event occurring (e.g., a counter reaching a particular value, etc.). For example and without limitation, a sensor unit autonomously generates events based on a state change of one or more of the following, in any combination:
 i. environmental probes (e.g., temperature, ambient light, motion or occupancy, humidity, etc.).
 ii. electrical inputs (i.e., binary, analog, bus), including from a switch.
 iii. signals received via radio (e.g., proximity beacons, etc.).
 iv. a state of the internal logic, woken up periodically based on time or on an external event.

As those who are skilled in the art will appreciate, after reading this disclosure, sensor unit 301-*j* can generate events based on different criteria than those listed above.

Processor 303 is a processing device, such as a microprocessor that is well known in the art. Processor 303 is configured such that, when operating in conjunction with the other components of sensor node 201-*m*, processor 303 executes software, processes data, and telecommunicates according to the operations described herein. In particular, processor 303 determines which data values, of which data elements, are to be included in packets to be transmitted, including a source address of corresponding sensor node 201-*m*.

In at least some embodiments of the present invention, one or more of the data values can be based on i) the events generated by the one or more sensor units and ii) associations between each event and the data values, as described below. The data values, which can include a "composite indication" and a "command indication", for example, are described in detail below and beginning with FIG. 6. Processor 303 also composes data packets that comprise the relevant data values.

Memory 304 is non-transitory and non-volatile computer storage memory technology that is well known in the art (e.g., flash memory, etc.). Memory 304 is configured to store operating system 311, application software 312, and database 313. The operating system is a collection of software that manages, in well-known fashion, sensor node 201-*m*'s hardware resources and provides common services for computer programs, such as those that constitute the application software. The application software that is executed by processor 303 according to an illustrative embodiment enables sensor node 201-*m* to perform the functions disclosed herein. Database 313 comprises information about each possible event and associated data values.

It will be clear to those having ordinary skill in the art how to make and use alternative embodiments that comprise more than one memory 304; or comprise subdivided segments of memory 304; or comprise a plurality of memory technologies that collectively store the operating system, application software, and database.

Radio communications module 305 is configured to enable sensor node 201-*m* to telecommunicate with other devices and systems, by receiving signals therefrom and/or transmitting signals thereto via receiver 321 and transmitter 322, respectively. For example, radio communications module 305 communicates with mobile station 203 and transmits data packets that can be used by one or more of actor nodes 202-1 through 202-*n*. Radio communications module 305 communicates via Bluetooth Low Energy (BLE). In some other embodiments, radio communications module 305 communicates via one or more other radio telecommunications protocols other than or in addition to BLE such as, but not limited to, Z-Wave, ZigBee, Thread, Wi-Fi, classic Bluetooth, and so on.

Receiver 321 is a component that enables sensor node 201-*m* to telecommunicate with other components and systems by receiving signals that convey information therefrom. It will be clear to those having ordinary skill in the art how to make and use alternative embodiments that comprise more than one receiver 321.

Transmitter 322 is a component that enables sensor node 201-*m* to telecommunicate with other components and systems by transmitting signals that convey information thereto. For example and without limitation, transmitter 322 is configured to transmit packets comprising the data values mentioned earlier, including the sensor node's source address. In some alternative embodiments of the present invention, transmitter 322 also transmits one or more destination addresses. It will be clear to those having ordinary skill in the art how to make and use alternative embodiments that comprise more than one transmitter 322.

In accordance with an illustrative embodiment, sensor node 201-*m* uses radio communications module 305 in order to telecommunicate wirelessly with external devices. It will clear to those skilled in the art, however, after reading the present disclosure, how to make use and use various embodiments of the present invention in which sensor node 201-*m* communicates via a wired protocol (e.g., X10, KNX, etc.) over physical media (e.g., cable, wire, etc.) with one or more external devices, either in addition to or instead of the wireless capability provided by radio communications module 305.

In generating and transmitting a packet, along with including its own network address as the source address in the packet, sensor node 201-*m* is said to originate the packet. In some embodiments of the present invention, sensor node 201-*m* can forward a packet that has been originated by a different sensor node.

Figure 4:
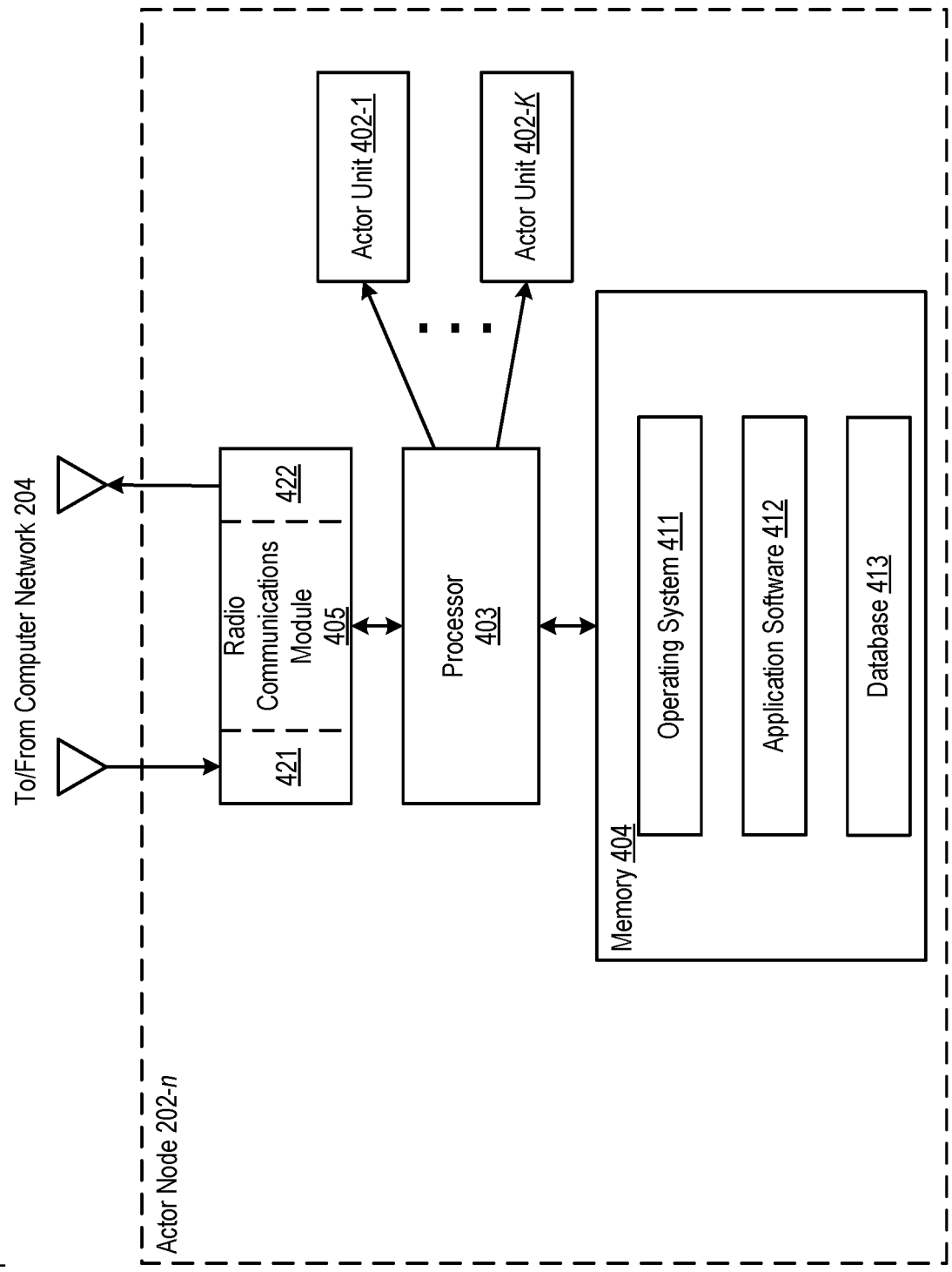
FIG. 4 depicts the salient components of actor node 202-*n* of system 200.

FIG. 4 depicts the salient components of actor node 202-*n* according to an illustrative embodiment of the present invention. Actor node 202-*n* is based on a data-processing apparatus whose hardware platform comprises: actor unit 402-1 through 402-K, wherein K is a positive integer; processor 403, memory 404, and radio communications module 405, interconnected as shown. In some alternative embodiments, there can also be one or more sensor units present and as part of the actor node, which are described above and in FIG. 3.

Actor unit 402-k, wherein k has a value between 1 and K, inclusive, is an apparatus that comprises memory, processing components, and communication components, and is capable of doing something in the course of being affected by signals (e.g., data packets, etc.) originating externally to the actor component, such as from one or more of sensor nodes 201-1 through 201-M, as described in detail below. Each actor unit 402-k takes decisions that are based on signals from one or more sources and performs appropriate actions upon the actor's environment. Each actor unit acts upon its environment in well-known fashion. In some embodiments, an actor unit is or comprises an actuator, as is known in the art.

Actor unit 402-k is configured to receive, transmit, process, and/or relay signals conveying data, as well as being configured to affect a condition, physical or otherwise, in its environment, for example by generating a control signal. For example and without limitation, the condition being affected can be:

i. lighting, which can be adjusted (e.g., turning on or off, changing brightness, changing color or mood, displaying a picture or pattern, etc.).
  ii. sound, which can be adjusted (e.g., increasing or decreasing volume, changing playlist or mood, turning on/off, selecting signal source, etc.).
  iii. room climate, which can be controlled (e.g., increasing or decreasing temperature, humidity, air fragrance, fan speed, etc.).
  iv. an alert, which can be generated (e.g., of an email, of an SMS message, etc.).
  v. monitoring by a camera, which can be panned or tilted.
  vi. office meeting/presentation settings (e.g., selecting one or more of signal source, streaming application, multimedia to play, audio language, subtitles, chapter, play/pause/stop, rewind/fast forward, etc.).
  vii. connected/smart video monitor features (e.g., selecting application to be launched, navigating through on-screen menus, etc.).
  viii. virtual keyboard—navigation on virtual keyboard displayed by other device (e.g., video monitor, set-top box, etc.).
  ix. control of shades/window coverings/blinds.
  x. access control (e.g., unlocking/locking doors, opening/shutting doors, authorizing access to selected rooms or zones, etc.).

As those who are skilled in the art will appreciate, after reading this disclosure, actor unit 402-k can provide a different function than those described above. Furthermore, actor node 202-n can comprise any combination of and any number of actor functions. As those who are skilled in the art will appreciate, after reading this disclosure, actor node 202-n comprising one or more actor functions can be in a variety of forms, such as a light bulb as part of a lighting system, a media player as part of an audio/video system, a heater and/or ceiling fan as part of an environment control system, an outgoing-email server as part of a messaging system, an actor in a water sprinkler system, a pump, a robot or robotic arm, a pan/tilt camera, a switch, a motor, a servo mechanism, and so on.

Processor 403 is a processing device that can be similar in hardware configuration to processor 303. Processor 403 determines which packets are to be processed and how each processed packet is to be used, in part based on the data values (e.g., source address, composite indication, command indication, etc.) contained in each packet.

Memory 404 is non-transitory and non-volatile computer storage memory technology that is well known in the art (e.g., flash memory, etc.) and that can be similar in hardware configuration to memory 304. Memory 404 is configured to store operating system 411, application software 412, and database 413. The operating system is a collection of software that manages, in well-known fashion, actor node 202-n's hardware resources and provides common services for computer programs, such as those that constitute the application software. The application software that is executed by processor 403 according to an illustrative embodiment enables actor node 202-n to perform the functions disclosed herein. Database 413 comprises information about each relevant data value, as described below.

Radio communications module 405 is configured to enable actor node 202-n to telecommunicate with other devices and systems, by receiving signals therefrom and/or transmitting signals thereto via receiver 421 and transmitter 422, respectively. Receiver 421 and transmitter 422 can be similar in hardware configuration to receiver 321 and transmitter 321, respectively. Radio communications module 405 communicates with mobile station 203 and detects data packets that are transmitted by one or more of sensor nodes 201-1 through 201-M. Radio communications module 405 communicates via Bluetooth Low Energy (BLE). In some other embodiments, radio communications module 405 communicates via one or more other radio telecommunications protocols other than or in addition to BLE such as, but not limited to, Z-Wave, ZigBee, Thread, Wi-Fi, classic Bluetooth, and so on.

Figure 5:
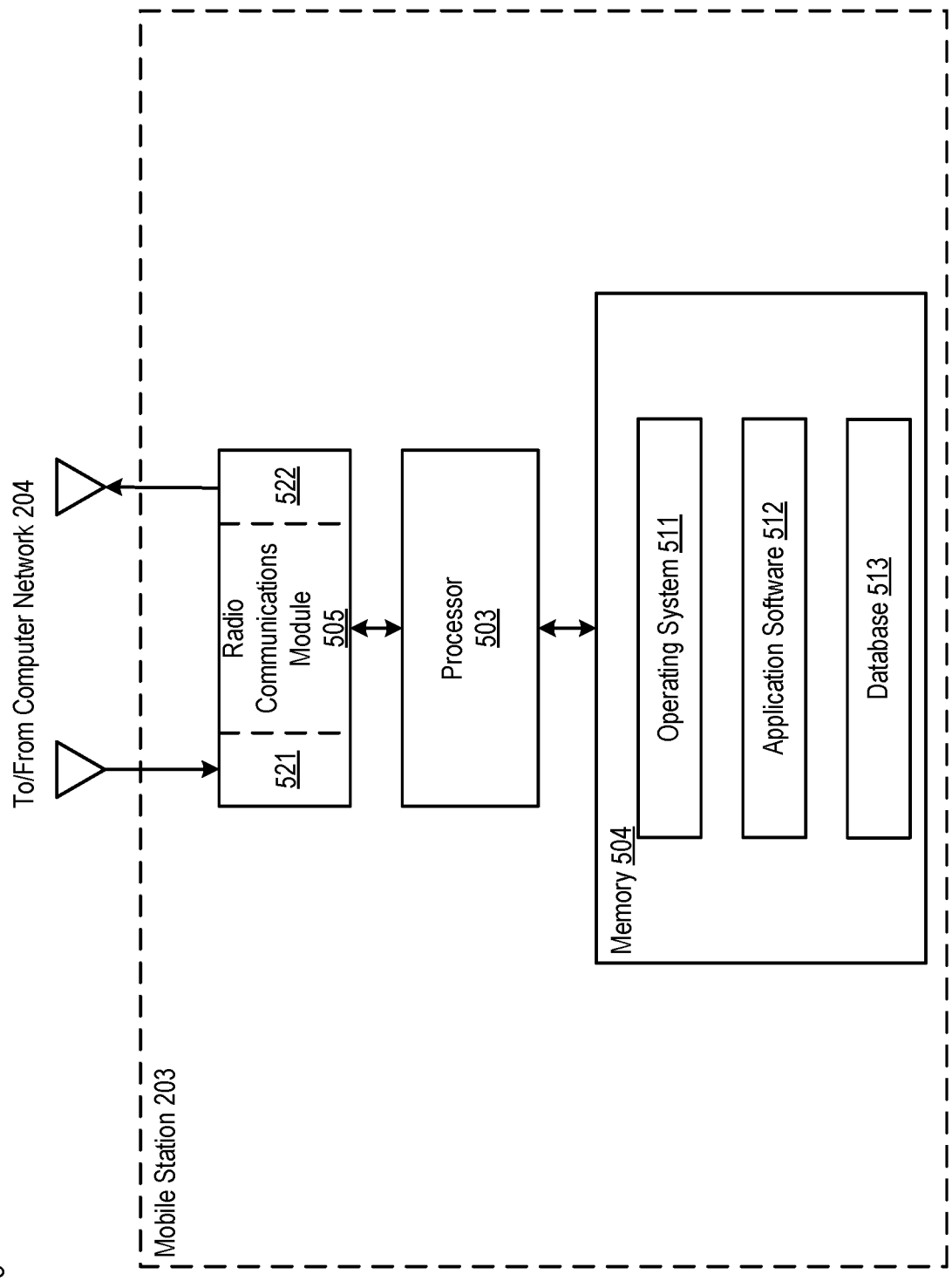
FIG. 5 depicts the salient components of mobile station 203 of system 200.

FIG. 5 depicts the salient components of mobile station 203 according to an illustrative embodiment of the present invention. Mobile station 203 is based on a data-processing apparatus whose hardware platform comprises: processor 503, memory 504, and radio communications module 505, interconnected as shown.

Processor 503 is a processing device, such as a microprocessor that is well known in the art. Processor 503 is configured such that, when operating in conjunction with the other components of mobile station 203, processor 503 executes software, processes data, and telecommunicates according to the operations described herein. For example, processor 503 determines which configuration messages are to be transmitted to which sensor nodes and actor nodes, as described below.

Memory 504 is non-transitory and non-volatile computer storage memory technology that is well known in the art (e.g., flash memory, etc.). Memory 504 is configured to store operating system 511, application software 512, and database 513. The operating system is a collection of software that manages, in well-known fashion, mobile station 203's hardware resources and provides common services for computer programs, such as those that constitute the application software. The application software that is executed by processor 503 according to an illustrative embodiment enables mobile station 203 to perform the functions disclosed herein. Database 513 comprises information about configuring each sensor node and actor node, as described below.

Radio communications module 505 is configured to enable mobile station 203 to telecommunicate with other devices and systems, by receiving signals therefrom and/or transmitting signals thereto via receiver 521 and transmitter 522, respectively. For example, radio communications module 505 communicates with sensor nodes 201-1 through 201-M and actor nodes 202-1 through 202-N. Radio communications module 505 communicates with the sensor and actor nodes via Bluetooth Low Energy (BLE) and communicates within the cellular network in accordance with a cellular protocol. In some other embodiments, radio communications module 505 communicates via one or more other radio telecommunications protocols.

Receiver 521 is a component that enables mobile station 203 to telecommunicate with other components and systems by receiving signals that convey information therefrom. It will be clear to those having ordinary skill in the art how to make and use alternative embodiments that comprise more than one receiver 521.

Transmitter 522 is a component that enables mobile station 203 to telecommunicate with other components and systems by transmitting signals that convey information thereto. It will be clear to those having ordinary skill in the art how to make and use alternative embodiments that comprise more than one transmitter 522.

Figure 6:
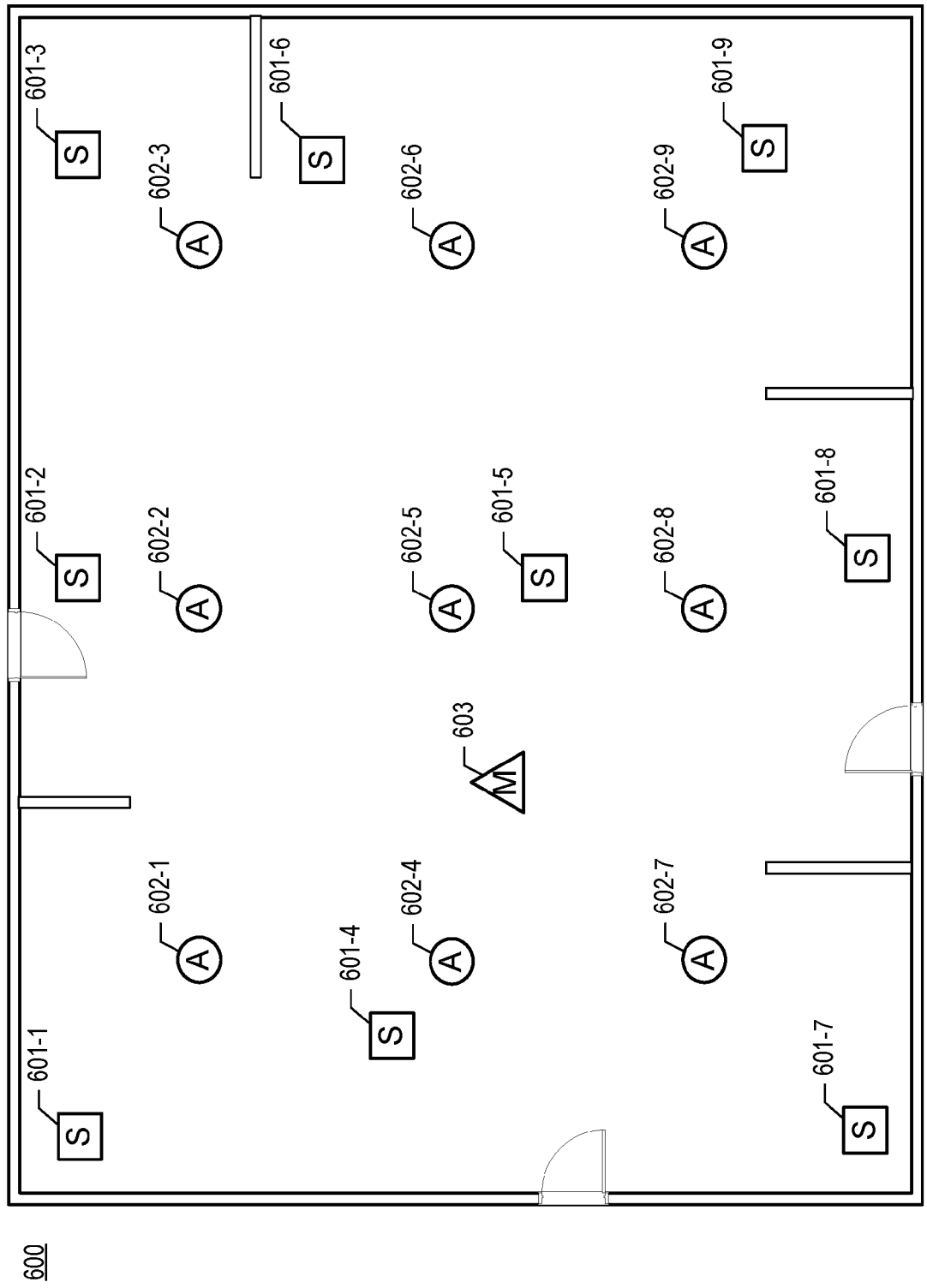
FIG. 6 depicts an illustrative floor plan of building 600.

First Scenario of Sensor Nodes and Actor Nodes:

FIG. 6 depicts an illustrative floor plan of building 600, in particular a section of a floor in the building. Building 600 is equipped with sensor nodes 601-1 through 601-9 (collectively referred to as "sensor nodes 601"), actor nodes 602-1 through 602-9 (collectively referred to as "actor nodes 602"), and mobile station 603. Sensor nodes 601, actor nodes 602, and mobile station 603 are non-limiting examples of sensor nodes 201, actor nodes 202, and mobile station 203, respectively. Each sensor node transmits packets containing its source address, and each actor node detects packets and makes decisions based on the source addresses in the detected packets.

Sensor nodes 601 are capable of sensing motion, from which occupancy can be inferred. Actor nodes 602 are capable of providing illumination based at least in part, one or more messages received from the sensor nodes. As those who are skilled in the art will appreciate, after reading this specification, the sensor nodes and/or actor nodes can provide different functionality from that just described. In addition, different sensor nodes can provide different functionality from one another, or different actor nodes can provide different functionality from one another, or both. Furthermore, building 600 can comprise different numbers of sensor nodes and actor nodes than those depicted.

Mobile station 603 is capable of configuring sensor nodes 601 and actor nodes 602, as described elsewhere in this specification. As those who are skilled in the art will appreciate after reading this specification, however, a different device can be used to configure the sensor and actor nodes.

Building 600 as depicted is an office building. As those who are skilled in the art will appreciate after reading this specification, however, building 600 can be a different type of structure with a roof and walls, or can instead be a defined area that comprises multiple sub-areas, wherein at least a portion of the area and/or sub-areas is defined by something other than a roof and/or walls.

Configuring the Sensor Nodes and Actor Nodes:

Sensor nodes 601 and actor nodes 602 are configured at configuration time, prior to entering their run-time modes. An installer, or other type of user, uses mobile station 603 to configure the sensor and actor nodes.

For example, for each and every actor node 602 in the depicted automation system, the user wants to configure the actor node to turn on its illumination source (i.e., "turn itself on") whenever one or more sensor nodes in the vicinity of that actor node sense motion (i.e., to infer occupancy). The user specifies this by using an app running on mobile station 603, by associating one or more sensor nodes with each actor node. In the example, the user configures node 602-1 to turn itself on whenever it receives a packet from nearby sensor node 601-1, 601-2, or 601-4 that indicates that motion is sensed. The user also configures node 602-2 to turn itself on whenever it receives a packet from sensor node 601-2 that indicates that motion is sensed. Node 602-3 is configured to turn itself on whenever it receives a packet from sensor node 601-2, 601-3, or 601-6. Node 602-4 is configured to turn on its illumination source whenever it receives a packet from sensor node 601-4 or 601-5. The user can similarly configure the other actor nodes to react, such that a given actor node turns on its illumination source based on detecting a packet with a source address of a relatively nearby, or otherwise appropriately situated, sensor node.

Mobile station 603 is capable of detecting commands being typed by its user and of translating those commands into configuration information. Based on the foregoing example, mobile station 603 translates the user's commands into messages that are sent to the actor nodes, in which the source addresses of the specific sensor nodes identified above are provided to the specific actor nodes with which those sensor nodes are associated. Each source address uniquely identifies the corresponding sensor node within the address space of the one or more sensor nodes in the example.

In some embodiments of the present invention, instead of manually associating the one or more sensor nodes with each actor node, the user can predetermine a radius around each actor node. Different radius values can be administered on a per-actor-node basis or on a per-zone (e.g., room, etc.) basis, for example and without limitation. Mobile station 603, instead of the user, can then determine which sensor nodes are within the user-defined radius from each actor node. This can be achieved, for example and without limitation, by first determining ahead of time the location of each sensor node and actor node, on a floor-by-floor basis or three-dimensionally within the entire building, based on each node's transmitted BLE beacon signal. Then, during the configuration process, mobile station 603 can compare each sensor node's location with that of each actor node to determine whether a sensor node is within the specified radius from the actor node. At that point, the mobile station can provide the source addresses of the within-radius sensor nodes to the appropriate actor nodes.

In some other embodiments of the present invention, for one or more sensor nodes, each sensor node can be associated with a zone (e.g., a room, a corridor, a lobby, etc.) to which the node belongs. Using at least some of the steps described above for radius-based configuration, but applied here to zone-based configuration, an actor node can then be configured with rules to react to packets from a predetermined zone or zones (e.g., the same zone as the actor node, an adjacent zone to that of the actor node, etc.), for one or more actor nodes.

In regard to the aforementioned embodiments that concern utilizing a sensor node's spatial coordinates, in some alternative embodiments it can be up to an actor node at run-time, instead of the mobile station at configuration time, to look up the spatial coordinates of the sensor node based on the source address contained in the packet that the actor node detects and decodes, and to execute logic to determine whether the sensor node is within the predetermined radius of the actor node based on the retrieved spatial coordinates. Similarly, in regard to the aforementioned embodiments that concern utilizing a sensor node's associated zone, in some alternative embodiments it can be up to an actor node at run-time, instead of the mobile station at configuration time, to look up the zone of the sensor node based on the source address contained in the packet that the actor node detects and decodes, and to execute logic to determine whether the zone is one to which the actor node is programmed to react.

Each actor node in FIG. 6 can be easily configured for conditional logic. For example, actor node 602-9, or a different actor node or nodes, can be configured to process an "AND" logic condition, in which sensor node 601-8 is configured to report on motion being sensed and sensor node 601-9 is configured to report on ambient light. In support of "daylight harvesting," as is known in the art, actor node 602-9 can turn on, turn off, or adjust its illumination output, based on the combination of i) motion being sensed or not being sensed, as reported by sensor node 601-8 and ii) the ambient light level being sensed, as reported by sensor node 601-9. For example, actor node 602-9 can turn itself on based on i) sensor node 601-8 sensing motion and ii) sensor node 601-9 sensing the ambient light level being below a predetermined level. In some embodiments, actor node 602-9 is further configured, such that it must detect the configured combination of packets from the reporting sensor nodes within a predetermined amount of time of each other; otherwise, the actor node can (or must) discard the packet or packets.

Still other configuration options can also be accommodated. For example, one or more sensor nodes 601 can be configured to generate an event indicator based on a particular condition occurring. In some embodiments, the sensor nodes can be configured to transmit a packet only if the condition is met (e.g., motion sensed, etc.).

Figure 7:
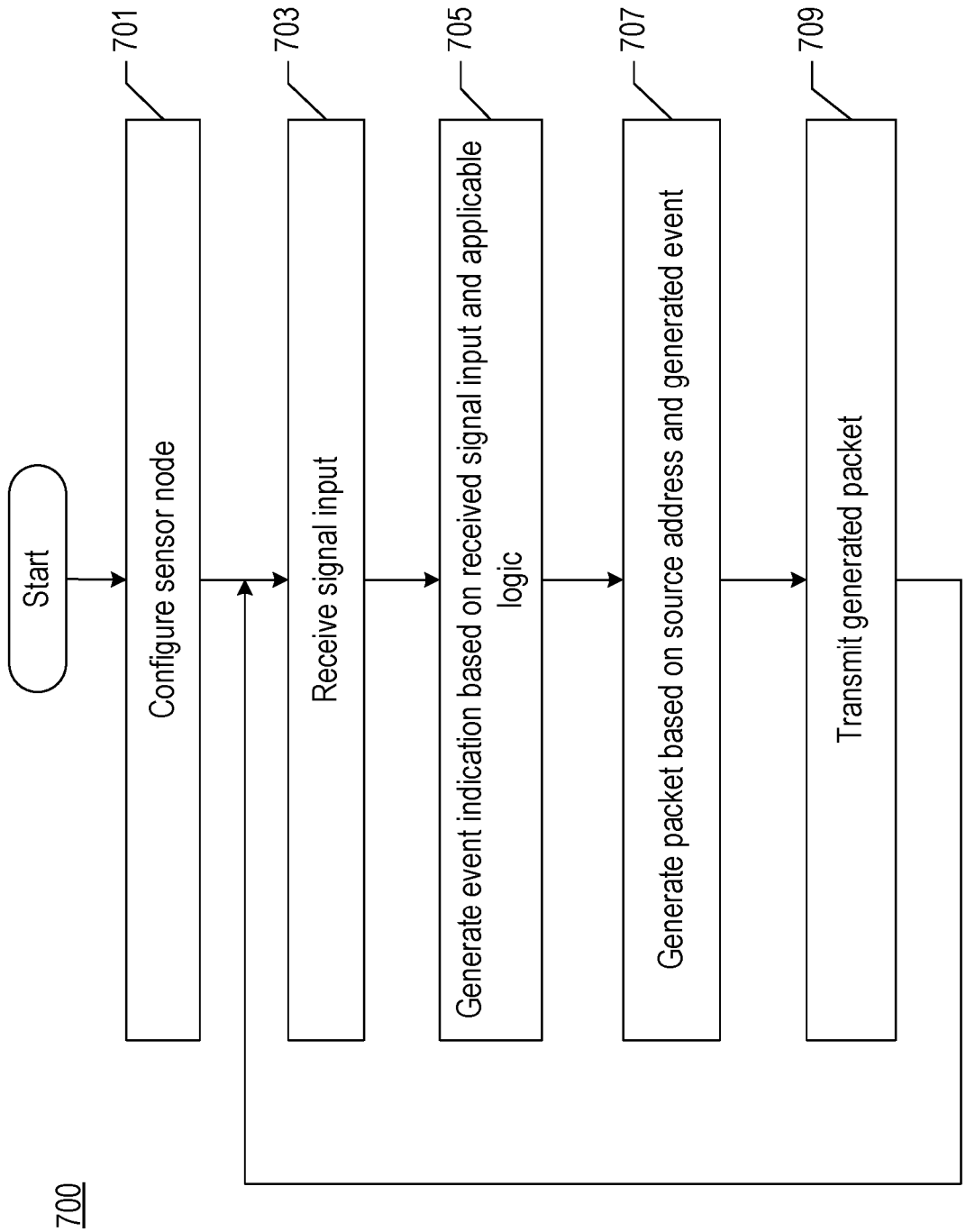
FIG. 7 depicts some salient operations of method 700 as performed by sensor node 601-1 within building 600, according to an illustrative embodiment of the present invention.

Operations of Sensor Node 601-*m*: FIG. 7 depicts some salient operations of method 700 according to an illustrative embodiment of the present invention, by which sensor node 601-1, which is featured here for pedagogical purposes, performs various actions.

In regard to method 700, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems.

In accordance with operation 701, sensor node 601-1 is configured as described above and with respect to FIG. 6. Then, the node enters a run-time mode.

In accordance with operation 703, node 601-1 receives a signal of the physical condition being monitored, the condition in the example being motion.

In accordance with operation 705, node 601-1 generates an event indication based on the received signal (i.e., based on the event occurring). For example, the event indication can be "motion detected" (i.e., from which occupancy can be inferred) or "motion not detected". In some embodiments of the present invention, the event can also be based on applicable logic.

In accordance with operation 707, node 601-1 generates a data packet containing the source address of node 601-1 and the event indication. Such a packet comprises a set of data elements, in which the source address, as a data element, is represented by its corresponding data value and the event indication, as another data element, is represented by its corresponding data value. In some embodiments, the generating of the packet itself signifies an indication of an event occurring; in this case, the inclusion of an event indication data element in the packet is optional.

In accordance with operation 709, node 601-1 transmits the generated packet via a computer network (not depicted) similar to computer network 204. In accordance with an illustrative embodiment of the present invention, node 601-1 is unaware of who the packet's recipients are and, accordingly, no identifier (e.g., network address, etc.) of any actor node, and that would uniquely identify that actor node, is present in the generated packet. An important aspect of this is that each actor node will be monitoring not for its own identifier (e.g., network address, etc.) in each transmitted packet, but for source identifiers (e.g., source network addresses, etc.) contained in the packets. In some alternative embodiments of the present invention, however, one or more actor identifiers (e.g., destination network addresses, etc.) can be present in one or more of the transmitted packets.

In some embodiments of the present invention, the transmitting sensor node does not expect an acknowledgment packet from the actor node, nor does it expect in general to be addressed by the actor node. Therefore, each transmitting sensor node might transmit the generated packet more than once in some embodiments, in order to improve the likelihood that the packet is detected and acted upon by the actor node.

After operation 709, control of execution returns to operation 703.

Concurrently with sensor node 601-1 operating in accordance with the operations described above, one or more physically distinct sensor nodes (e.g., sensor node 601-2, etc.) in addition to sensor node 601-1 can operate in accordance with the operations described above. In this way, multiple sensor nodes can be concurrently transmitting packets via the computer network, and without any coordination of one other.

Figure 8:
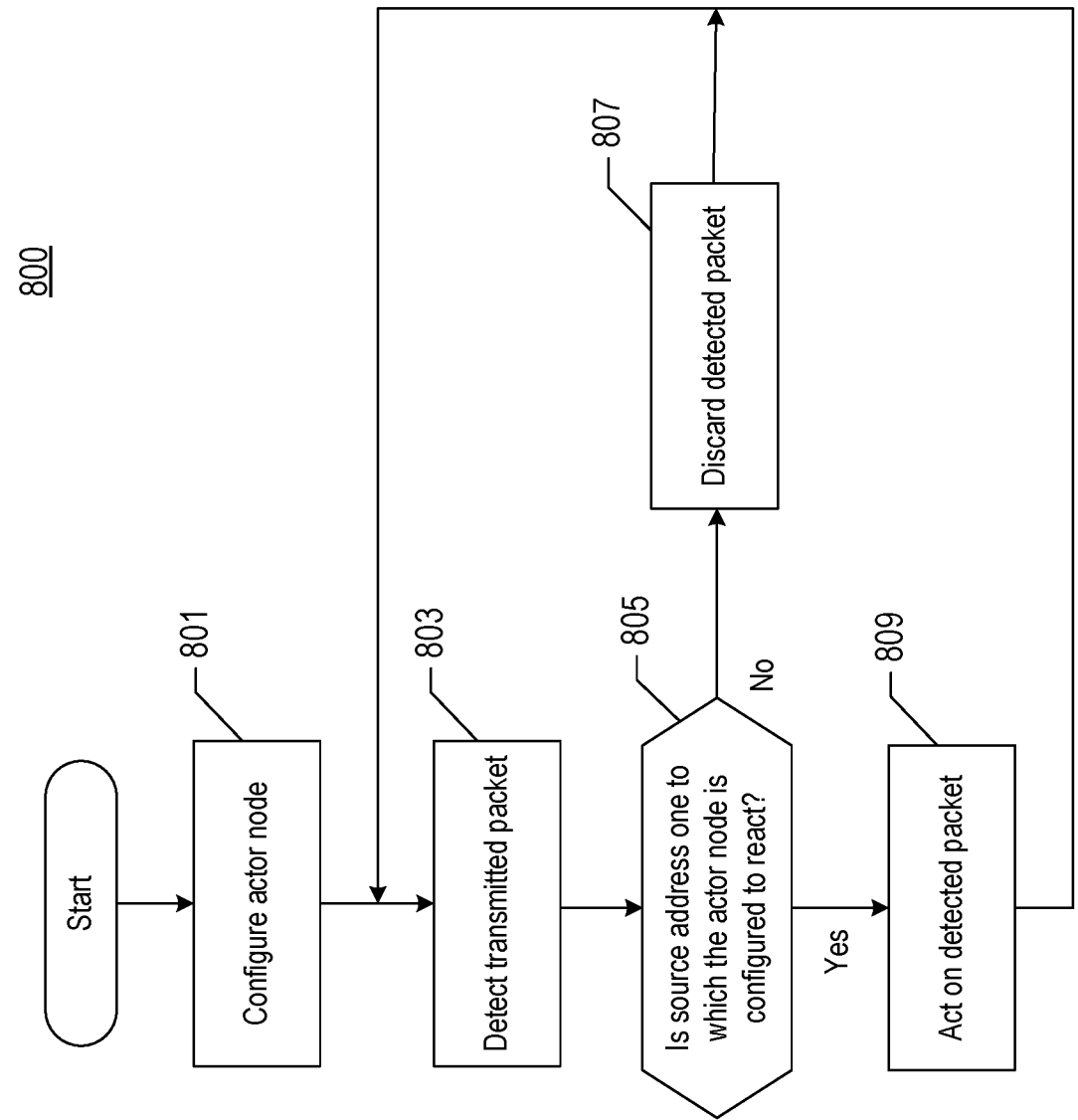
FIG. 8 depicts some salient operations of method 800 as performed by actor node 602-1 within building 600, according to an illustrative embodiment of the present invention.

Operations of Actor Node 602-*n*: FIG. 8 depicts some salient operations of method 800 according to an illustrative embodiment of the present invention, by which actor node 602-1, which is featured here for pedagogical purposes, performs various actions. In accordance with operation 801, actor node 602-1 is configured as described above and in FIG. 6. Then, the node enters a run-time mode.

Actor node 602-1 then begins monitoring transmitted packets containing sets of data elements (e.g., tuples, etc.), in the plurality of packets being transmitted by one or more sensor nodes as described with respect to FIG. 7. In accordance with operation 803 and as part of the ongoing monitoring, node 602-1 detects a transmitted packet containing a transmitted set of data elements and, as such, is a recipient of the transmitted packet.

In accordance with operation 805, node 602-1 determines whether the source address contained in the packet, if a source address is present, is one to which node 602-1 is configured to react (i.e., as determined in operation 901). If it is not one to which node 602-1 is configured to react, control of execution proceeds to operation 807. If it is one to which node 602-1 is configured to react, control of execution proceeds to operation 809.

In accordance with operation 807, node 602-1 discards the detected packet, taking no further action with the packet. Control of execution then returns to operation 803.

In accordance with operation 809, node 602-1 acts on the detected packet, at least in part by generating a signal (e.g., a control signal to apply a configured control value, etc.). For example, node 602-1 in FIG. 6 generates a control signal to turn on its illumination source whenever, as configured, it receives a packet from sensor node 601-1, 601-2, or 601-4 that indicates that motion is sensed. Other examples of how node 902-3 can act on the detected packet can be found in U.S. patent application Ser. No. 14/467,407, filed Aug. 25, 2014, which is incorporated by reference herein.

Control of execution then returns to operation 803.

Concurrently with actor node 602-1 operating in accordance with the operations described above, one or more physically distinct actor nodes (e.g., actor node 602-2, etc.) in addition to actor node 602-1 can operate in accordance with the operations described above. Continuing with the example above, in addition to node 602-1 turning itself on whenever it receives a packet from sensor node 601-1, 601-2, or 601-4, node 602-2, 602-3, 602-4, and so on, can each turn themselves on in accordance with how they were configured, as described earlier and in respect of FIG. 6.

Multiple actor nodes can be concurrently monitoring for and detecting packets transmitted via the computer network, from one or more sensor nodes and without any coordination of each other. Notably, multiple actor nodes might act on a particular packet, based in part on the source address and/or event indication contained in the packet being relevant to more than one actor node and possibly on the source address and/or event indication having been present in previous packets.

In contrast to multiple actor nodes acting on one or more source addresses, a system not making its decision based on source addresses would be problematic in some ways. Using the sensor/actor relationships established in FIG. 6 for a hypothetical example in which actor nodes do not base decisions on source addresses, sensor node 601-4 would have to trigger actor nodes 601-2 and 602-4. This would require sensor node 601-4 to keep sending multiple unicast messages to each of actor nodes 601-2 and 602-4, or there would have to be multiple overlapping groups defined. In addition, the other sensor nodes would similarly need to trigger tho actor nodes with which the sensor nodes have a relationship.

Second Scenario of Sensor Nodes and Actor Nodes: FIGS. 9A and 9B depict an illustrative floor plan of building 900, in accordance with an illustrative embodiment of the present invention. In particular, FIG. 9A depicts a cross-section of building 900, and FIG. 9B depicts a section of the middle floor of the building. Building 900 is equipped with sensor nodes 901-1 through 901-6 (collectively referred to as "sensor nodes 901"), actor nodes 902-1 through 902-6 (collectively referred to as "actor nodes 902"), and mobile station 903. Sensor nodes 901, actor nodes 902, and mobile station 903 are non-limiting examples of sensor nodes 201, actor nodes 202, and mobile station 203, respectively. Each sensor node transmits packets containing its source address and configuration information as described below, and each actor node detects packets and makes decisions based on both the source addresses and the configuration information in the detected packets.

Sensor nodes 901 are capable of sensing motion, from which occupancy can be inferred. Actor nodes 902 are capable of providing illumination based at least in part, one or more messages received from the sensor nodes. As those who are skilled in the art will appreciate, after reading this specification, the same variations described above and with respect to FIG. 6 are applicable to what is depicted in FIGS. 9A and 9B, including but not limited to the support of conditional logic (e.g., "a particular scene is applicable" AND "the ambient light level being sensed is below a predetermined level").

Figure 10:
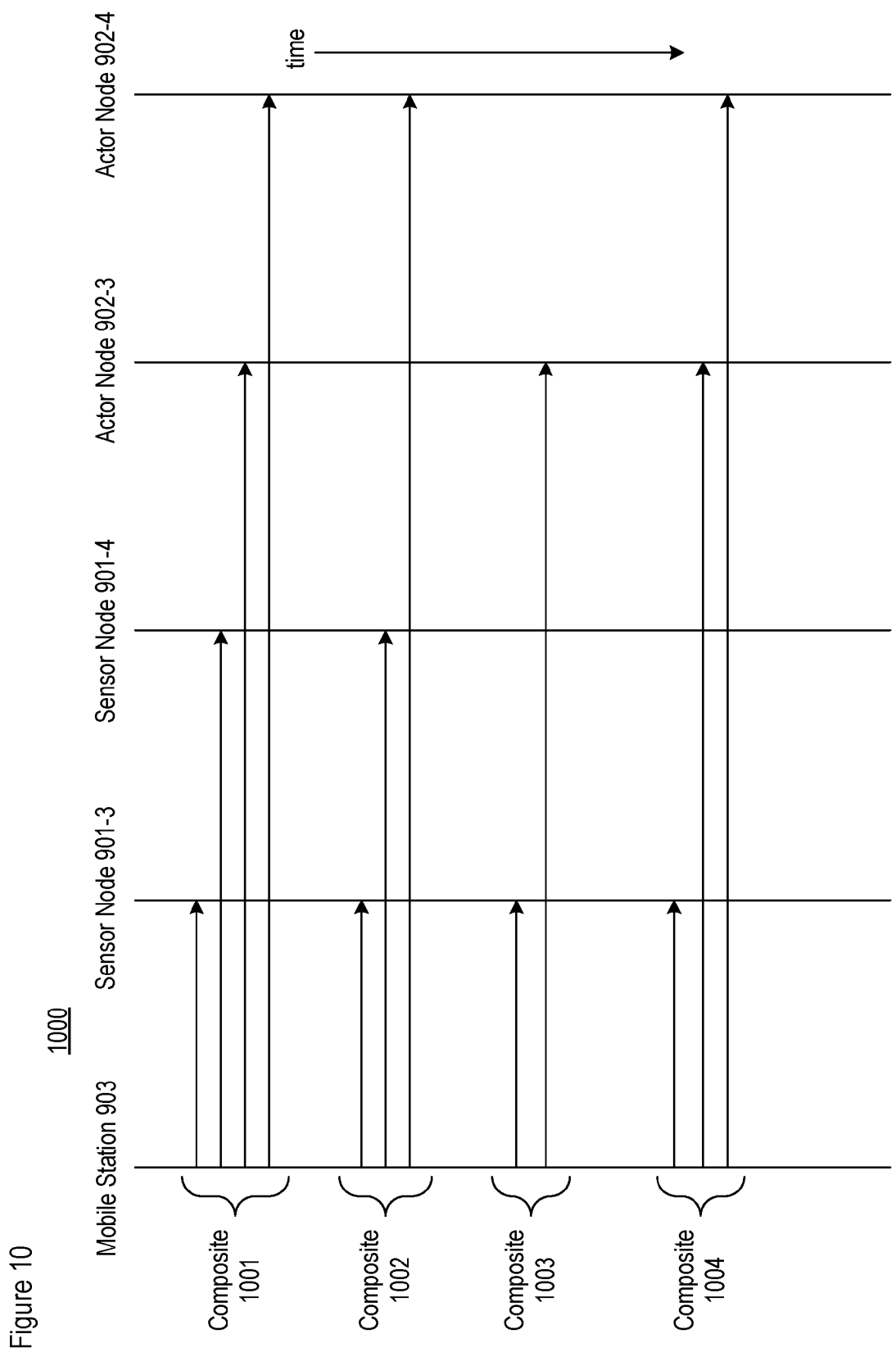
FIG. 10 depicts some salient operations of method 1000 as performed by mobile station 903 within building 900, according to an illustrative embodiment of the present invention.

Configuring the Sensor Nodes and Actor Nodes: FIG. 10 depicts some salient operations of method 1000 as performed by mobile station 903 and according to an illustrative embodiment of the present invention, by which one or more of sensor nodes 901-1 through 901-6 and actor nodes 902-1 through 902-6 are configured. As depicted, mobile station 903, by executing a smartphone application, is currently being used to configure the sensor and actor nodes on the middle floor of building 900—namely, sensor nodes 901-3 and 901-4 and actor nodes 902-3 and 902-4. As those who are skilled in the art will appreciate after reading this specification, however, mobile station 903 can be used to configure any number of sensor nodes and actor nodes, and in any combination.

Mobile station 903 detects commands being typed by its user, who is using the smartphone application to configure his home automation system, and translates those commands into configuration information. In addition to including the source addresses of one or more sensor nodes, as described above and with respect to FIG. 6, the configuration information represents one or more "composites," each of which is something that is composed of separate parts. An example of a composite is a "scene," which is defined by a group of presets. To simplify control of a group of devices in a given space (e.g., a room, etc.), it is convenient to define presets for each device (e.g., a smart lamp, etc.), associated with certain scenarios. As those who are skilled in the art will appreciate after reading this specification, a "composite" is a generalization that can refer to a scene or to something else.

An intended effect associated with first defining and configuring, and then engaging a composite during run-time, is that the user perceives a set of actor node devices as adjusting in unison as part of the user-defined composite having been engaged. In accordance with an illustrative embodiment of the present invention, this occurs without any direct communication, in the form of actor-specific addressing, or direct coordination, in the form of actor-specific commands, between the one or more sensor nodes involved and the one or more actor nodes involved. Furthermore, this effect relies on the proper information being initially configured for each user-defined composite, across the sensor and actor nodes involved in each defined composite.

Additionally, the source addresses, where provided, can provide additional control to the one or more actor nodes. For example and without limitation, the user can configure actor nodes 902-3 and 902-4 to act on only those messages being transmitted by sensor nodes on the same floor as the actor nodes—namely, sensor nodes 901-3 and 901-4—or sensor nodes situated within a different type of predetermined area. It will be clear to those skilled in the art, after reading this specification, how to make and use embodiments of the present invention in which one or more source addresses are used to provide other types of control than in the foregoing example.

As discussed above and in FIG. 3, each sensor node autonomously generates events based on a state change of one or more properties (e.g., ambient lighting, etc.). In order to properly translate such events into meaningful data values during run-time, selected events are associated with source addresses and/or composites during the configuration process involving method 1000. Composites are identified by "composite indications," and commands, which are identified by "command indications." These composite indications and command indications are stored in memory in each configured sensor node. Notably, the composite indications and command indications can be different for each sensor node, depending on each particular sensor nodes involvement in a particular defined composite.

As discussed above and in FIG. 4, each actor node determines which packets are to be processed and how each processed packet is to be used, in part based on one or more source addresses and/or other data values (e.g., composite indication, command indication, etc.) contained in each packet. In order to properly translate such data values into the appropriate actions during run-time, during the configuration process involving method 1000 the actor nodes each has a portion of memory (e.g., a set of registers, etc.) initialized, into which memory data values are stored. For examples of such values, refer to U.S. patent application Ser. No. 14/467,407, filed Aug. 25, 2014.

Referring to the specific example depicted in FIG. 10, mobile station 903 is configuring the depicted sensor and actor nodes to be able to handle four different composites: composites 1001 through 1004. Because each composite will have a different effect on the environment being controlled, each composite provides different source addresses and/or data values to a different combination of sensor nodes and actor nodes. Composite 1001 requires the initialization of all nodes depicted in FIG. 9B. Composite 1002 requires the initialization of both sensor nodes and actor node 902-4 only. Composite 1003 requires the initialization of sensor node 901-3 and actor node 902-3 only. And composite 1004 requires the initialization of sensor node 901-3 only and both actor nodes.

As those who are skilled in the art will appreciate, after reading this specification, there are various implications in not having all nodes being initialized for all composites. As one example, sensor node 901-4 will not be involved in the enabling of composites 1003 and 1004 because these composites do not require sensor node 901-4's involvement. As another example, actor nodes 902-3 and 902-4 will not be involved in the enabling of composites 1002 and 1003, respectively, because these composites do not require the involvement of these actor nodes. Notably, one or more of the composite indications defined at mobile station 903 might be initialized in multiple actor nodes, while one or more of the composite indications might be initialized in only a single actor node.

Figure 11:
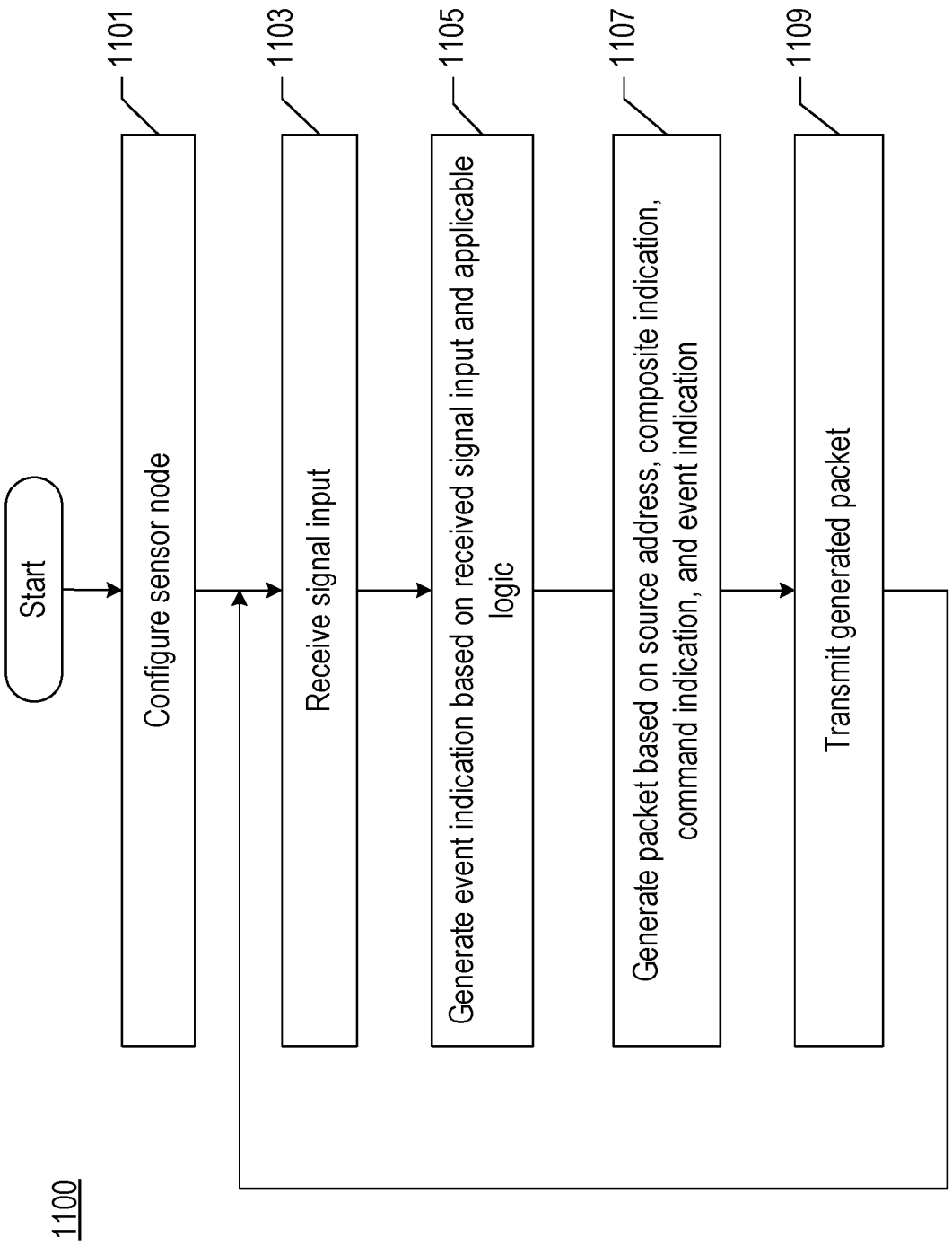
FIG. 11 depicts some salient operations of method 1100 as performed by sensor node 901-3 within building 900, according to an illustrative embodiment of the present invention.

Operations of Sensor Node 901-*m*: FIG. 11 depicts some salient operations of method 1100 according to an illustrative embodiment of the present invention, by which sensor node 901-3, which is featured here for pedagogical purposes, performs various actions. In accordance with operation 1101, sensor node 901-3 is configured as described above and in FIG. 10. Then, the node enters a run-time mode.

In accordance with operation 1103, node 901-3 receives a signal of the physical condition being monitored (e.g., "ambient lighting level", etc.).

In accordance with operation 1105, node 901-3 generates an event based on both the received signal and applicable logic.

In accordance with operation 1107, node 901-3 generates a data packet containing the composite indication and command indication mapped to the particular generated event, based on the information configured in operation 1101. The data packet also contains the source address of node 901-3.

In accordance with operation 1109, node 901-3 transmits the generated packet via a computer network (not depicted) similar to computer network 204. In accordance with an illustrative embodiment of the present invention, node 901-3 is unaware of who the packet's recipients are and, accordingly, no identifier (e.g., network address, etc.) of any actor node, and that would uniquely identify that actor node, is present in the generated packet. An important aspect of this is that each actor node will be monitoring not for its own identifier (e.g., actor's network address, etc.) in each transmitted packet, but for source identifiers (e.g., source network addresses, etc.) contained in the packets as well as relevant composite indications contained in the packets. In some alternative embodiments of the present invention, however, one or more actor identifiers (e.g., destination network addresses, etc.) can be present in one or more of the transmitted packets.

After operation 1109, control of execution returns to operation 1103.

Concurrently with sensor node 901-3 operating in accordance with the operations described above, one or more physically distinct sensor nodes (e.g., sensor node 901-1, sensor node 901-4, etc.) in addition to sensor node 901-3 can operate in accordance with the operations described above. In this way, multiple sensor nodes can be concurrently transmitting packets via the computer network, and without any coordination of each other.

Figure 12:
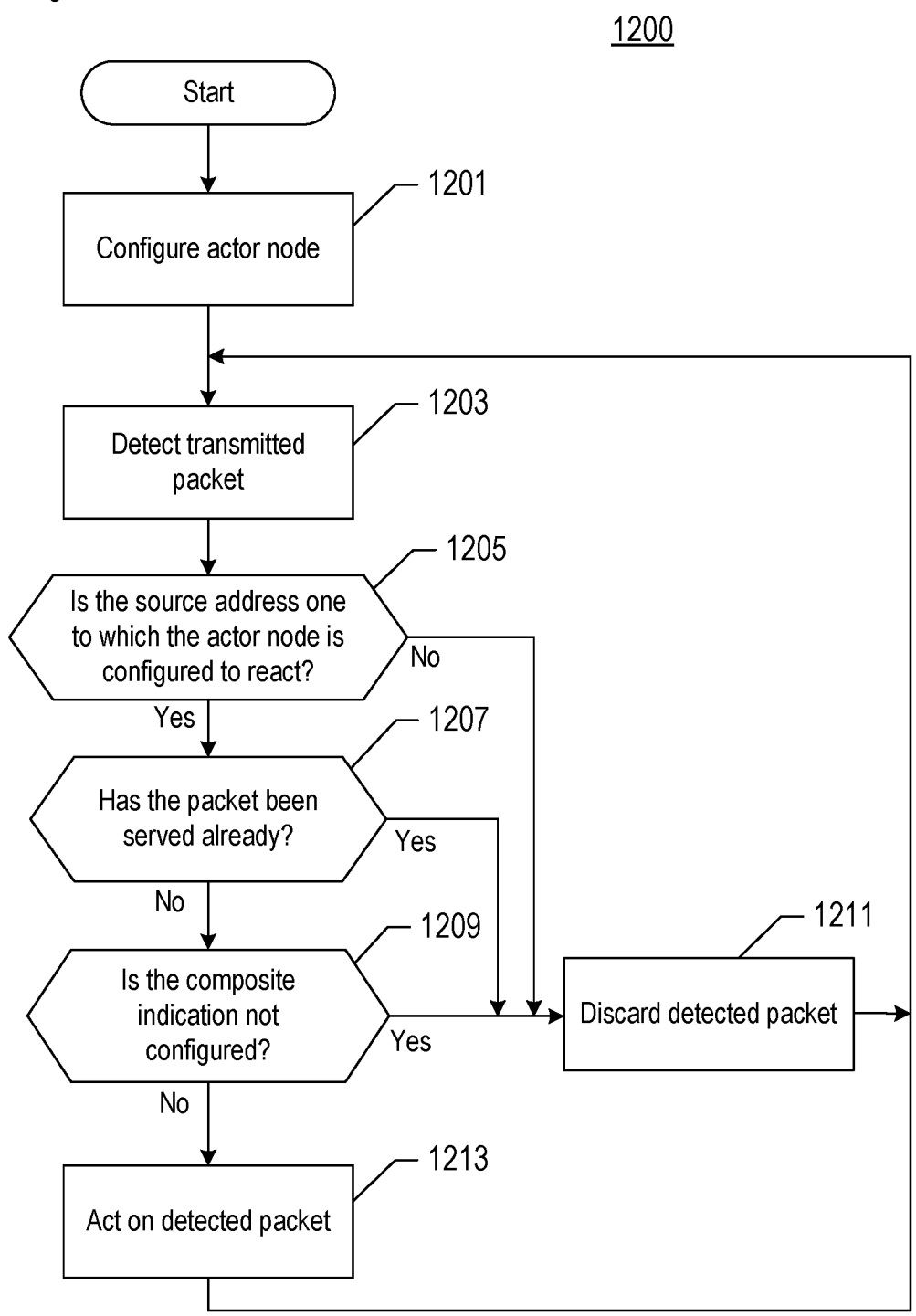
FIG. 12 depicts some salient operations of method 1200 as performed by actor node 902-3 within building 900, according to an illustrative embodiment of the present invention.

Operations of Actor Node 902-*n*: FIG. 12 depicts some salient operations of method 1200 according to an illustrative embodiment of the present invention, by which actor node 902-3, which is featured here for pedagogical purposes, performs various actions. In accordance with operation 1201, actor node 902-3 is configured as described above and in FIG. 7. Then, the node enters a run-time mode.

Actor node 902-3 then begins monitoring transmitted packets containing sets of data elements (e.g., tuples, etc.), in the plurality of packets being transmitted by one or more sensor nodes as described with respect to FIG. 11. In accordance with operation 1203 and as part of the ongoing monitoring, node 902-3 detects a transmitted packet containing a transmitted set of data elements and, as such, is a recipient of the transmitted packet.

In accordance with operation 1205, node 902-3 determines whether the source address contained in the packet, if a source address is present, is one to which node 902-3 is configured to react (i.e., as determined in operation 1201). If it is not one to which node 902-3 is configured to react, control of execution proceeds to operation 1211. If it is one to which node 902-3 is configured to react, control of execution proceeds to operation 1207.

In accordance with operation 1207, node 902-3 determines whether it has already served the packet. If it has, control of execution proceeds to operation 1211. If not, control of execution proceeds to operation 1209. In some embodiments of the present invention, node 902-3 determines whether it has already served the packet by examining a timestamp contained in the packet and comparing the timestamp to an internal clock, thereby checking whether it has already seen this packet within a predetermined time interval.

In accordance with operation 1209, node 902-3 determines whether the composite indication contained in the packet has been configured in its memory (i.e., as part of operation 1201). If it has not been configured, control of execution proceeds to operation 1211. If it has been configured, control of execution proceeds to operation 1213.

In accordance with operation 1211, node 902-3 discards the detected packet, taking no further action with the packet. Control of execution then returns to operation 1203.

In accordance with operation 1213, node 902-3 acts on the detected packet, at least in part by generating a signal (e.g. a control signal to apply a configured control value, etc.).

Examples of how node 902-3 can act on the detected packet can be found in U.S. patent application Ser. No. 14/467,407, filed Aug. 25, 2014.

Control of execution then returns to operation 1203.

Concurrently with actor node 902-3 operating in accordance with the operations described above, one or more physically distinct actor nodes (e.g., actor node 902-2, actor node 902-4, etc.) in addition to actor node 902-3 can operate in accordance with the operations described above. In this way, multiple actor nodes can be concurrently monitoring for and detecting packets transmitted via the computer network, from one or more sensor nodes and without any coordination of each other. Notably, multiple actor nodes might act on a particular packet, based in part on the composite indication contained in the packet being relevant to more than one actor node and possibly on additional composite indications having been indicated in previous packets, as well as on the source address contained in the particular packet.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising a first actor node, the first actor node comprising:
   a memory configured to store i) a first source address of a first sensor node and ii) a second source address of a second sensor node, as configuration information for acting on the first and second source addresses when detected in data packets;
   a receiver configured to monitor a plurality of wirelessly-transmitted data packets for the first and second source addresses, wherein the transmitted packets originate at a plurality of sensor nodes that comprises the first and second sensor nodes; and
   a processor configured to generate a signal in response a detection of both i) a first packet having the first source address and ii) a second packet having the second source address, the signal being based on i) a first event whose occurrence is indicated by the first sensor node and ii) a second event whose occurrence is indicated by the second sensor node, wherein the processor is configured to generate the signal without either of the first and second packets addressing the first actor node.

2. The system of claim 1 wherein the processor is configured to generate the signal further based on the first actor node detecting both the first and second packets within a predetermined amount of time of each other.

3. The system of claim 1 wherein the processor is further configured to discard the first packet if the first actor node fails to detect the second packet within the predetermined amount of time.

4. The system of claim 1, further comprising the first sensor node, wherein the first sensor node is configured to transmit the first packet, wherein the first source address uniquely identifies the first sensor node within an address space of the plurality of sensor nodes, and wherein the first sensor node is unaware of that the first actor node is a recipient of the first packet.

5. The system of claim 4 wherein the first sensor node is configured to indicate the first event by transmitting the first packet.

6. The system of claim 4 wherein the first sensor node is configured to indicate the first event by setting a particular data value in the first packet.

7. The system of claim 1 wherein the first event is that of motion being sensed, wherein the second event is that of the ambient light level being sensed, and wherein the signal generated controls a source of illumination.

8. The system of claim 1 wherein the first actor node is further configured to replay at least some of the data packets that the first actor node receives, in accordance with a mesh network.

9. A method comprising:
   storing into a memory, by a first actor node, i) a first source address of a first sensor node and ii) a second source address of a second sensor node, thereby configuring the first actor node, at least in part, to act on the first and second source addresses when detected in data packets;
   monitoring, by the first actor node, a plurality of wirelessly-transmitted data packets for the first and second source addresses, wherein the transmitted packets originate at a plurality of sensor nodes that comprises the first and second sensor nodes; and
   if, in the plurality of transmitted packets being monitored, the first actor node detects both i) a first packet having the first source address and ii) a second packet having the second source address, generating a signal based on i) a first event whose occurrence is indicated by the first sensor node and ii) a second event whose occurrence is indicated by the second sensor node, wherein the generating of the signal, by the first actor node, occurs without either of the first and second packets addressing the first actor node.

10. The method of claim 9 wherein the generating of the signal is based on the first actor node detecting both the first and second packets within a predetermined amount of time of each other.

11. The method of claim 9 further comprising discarding the first packet, by the first actor node, if the first actor node fails to detect the second packet within the predetermined amount of time.

12. The method of claim 9, further comprising transmitting, by the first sensor node, the first packet, wherein the first source address uniquely identifies the first sensor node within an address space of the plurality of sensor nodes, and wherein the first sensor node is unaware of that the first actor node is a recipient of the first packet.

13. The method of claim 12 wherein the first sensor node indicates the first event by transmitting the first packet.

14. The method of claim 12 wherein the first sensor node indicates the first event by setting a particular data value in the first packet.

15. The method of claim 9 wherein the first event is that of motion being sensed, wherein the second event is that of the ambient light level being sensed, and wherein the signal generated controls a source of illumination.

16. The method of claim 9, further comprising replaying, by the first actor node, at least some of the data packets that the first actor node receives, in accordance with a mesh network.

17. A non-transitory memory storing a computer program, the computer program including one or more sequences of one or more instructions which, when executed by one or more processors, cause a first actor node to at least perform the following:
   store into a memory i) a first source address of a first sensor node and ii) a second source address of a second sensor node, thereby configuring the first actor node, at least in part, to act on the first and second source addresses when detected in data packets;

monitor a plurality of wirelessly-transmitted data packets for the first and second source addresses, wherein the transmitted packets originate at a plurality of sensor nodes that comprises the first and second sensor nodes; and if, in the plurality of transmitted packets being monitored, the first actor node detects both i) a first packet having the first source address and ii) a second packet having the second source address, generate a signal based on i) a first event whose occurrence is indicated by the first sensor node and ii) a second event whose occurrence is indicated by the second sensor node, wherein the generating of the signal, by the first actor node, occurs without either of the first and second packets addressing the first actor node.

* * * * *